United States Patent [19]

Grohman

[11] Patent Number: 5,324,461
[45] Date of Patent: Jun. 28, 1994

[54] FOAMABLE POLYVINYL CHLORIDE COMPOSITION, FOAMED ARTICLES MADE THEREFROM, AND A PROCESS FOR MAKING VINYL CHLORIDE POLYMERIC FOAMED ARTICLES

[75] Inventor: Martin Grohman, Marietta, Ohio

[73] Assignee: General Electric Company, Pittsfield, Mass.

[21] Appl. No.: 146,863

[22] Filed: Nov. 3, 1993

Related U.S. Application Data

[62] Division of Ser. No. 53,982, Apr. 27, 1993, Pat. No. 5,278,198.

[51] Int. Cl.$^5$ ............................................. B29D 7/00
[52] U.S. Cl. ..................................... 264/45.9; 264/46.1
[58] Field of Search ................................. 264/45.9, 46.1

[56] References Cited

U.S. PATENT DOCUMENTS

| | | | |
|---|---|---|---|
| 4,041,106 | 8/1977 | Ide et al. | 525/84 |
| 4,152,495 | 5/1979 | Labar | 521/82 |
| 4,431,772 | 2/1984 | Katto et al. | 525/80 |
| 4,613,178 | 9/1986 | Fujita | 264/171 |
| 4,683,247 | 7/1987 | Allen et al. | 521/91 |
| 5,095,083 | 3/1992 | Deschamps et al. | 526/329.2 |

OTHER PUBLICATIONS

Formulating Technology for Rigid Cellular PC Sheet, Szamborski & Pfennig, Journal of Vinyl Technology, Jun. 1992, vol. 14, No. 2, pp. 105–109.

*Primary Examiner*—Morton Foelak

[57] ABSTRACT

Foamable thermoplastic resin compositions are provided having vinyl chloride polymer, a graft copolymer having a superstrate grafted to a substrate wherein the superstrate has alphamethyl styrene, unsaturated nitrile, and unsubstituted styrene therein, and the substrate is a butadiene rubber, a rubber-free copolymer having alkylmethacrylate, vinyl aromatic, and unsaturated nitrile therein, and a chemical blowing agent. The foamable thermoplastic resin composition may be coextruded with a non-foamed thermoplastic resin skin to produce a coextruded rigid foamed structure by a process of coextruding the skin and foamable thermoplastic composition. The composition and process are useful for, making coextruded rigid foam structures which are useful in rigid foam applications such as foamed pipe and foamed sheet.

6 Claims, 1 Drawing Sheet

FOAMABLE POLYVINYL CHLORIDE COMPOSITION, FOAMED ARTICLES MADE THEREFROM, AND A PROCESS FOR MAKING VINYL CHLORIDE POLYMERIC FOAMED ARTICLES

This is a divisional of co-pending application Ser. No. 08/053,982 filed on Apr. 27, 1993. U.S. Pat. No. 5,278,198.

BACKGROUND OF THE INVENTION

1. Field of the Invention

This invention relates to foamable thermoplastic resin compositions, coextruded rigid foam articles, and processes for making coextruded rigid foam articles, and more particularly relates to foamable thermoplastic resin compositions having a vinyl chloride polymer, a graft copolymer, a rubber-free copolymer, and a chemical blowing agent, coextruded rigid foam articles made therefrom, and processes for making such coextruded rigid foam articles.

2. Description of the Related Art

Polyvinyl chloride compositions comprising graft copolymers having a superstrate of alphamethyl styrene-unsaturated nitrile-unsubstituted styrene and a substrate of butadiene rubber, are known for making non-foam articles. Such compositions have exhibited increased heat distortion temperatures due to the presence of the graft copolymer, but such compositions have typically lacked the melt strength required for making foamed articles, and thus have not contained blowing agents therein or been made into rigid foam articles. Additionally, the addition of the heat distortion temperature increasing graft copolymer into foamable thermoplastic resin compositions would not be obvious to one skilled in the art due in part to the lack of a need for increased heat distortion temperature in typical uses for rigid foam vinyl chloride articles, for example, foam drain pipe, waste pipe, vent pipe and foam sheet for construction.

Foamable thermoplastic resin compositions comprising vinyl chloride polymer, methyl methacrylate-styrene-acrylonitrile terpolymer and a blowing agent are known, see French published application serial no. 89/05,537, filed Apr. 26, 1989, by inventors Jacky Patric Dominique Des Champs and Marc Loibl, but such compositions have typically exhibited higher levels of viscosity than are desired for coextrusion processes of non-foamed resin skin and the foamable compositions which due to pressure build ups and excessive shear in such processes can lead to heat build up of the compositions due to the working torque resulting from the shear, and leading to premature foaming of the materials and possible degradation of the vinyl chloride polymer resulting from the temperature increase.

Foamable thermoplastic compositions comprising vinyl chloride polymer, butylacrylate rubber-based graft copolymers and polymethyl methacrylate rigid polymer have been used in coextrusion processes for making rigid foam structures, but such materials typically exhibit undesirably low impact strengths, and elongated cell structures in the foam due to poor melt strength rather than circular/spherical cell structures.

Accordingly, there is a need to provide foamable thermoplastic resin compositions, which exhibit enhanced melt strength, reduced viscosity, reduced processing sensitivity and desired formation of spherical cell structures, impact strength and rigidity in coextruded rigid foam structures formed therefrom by coextrusion processes.

SUMMARY OF THE INVENTION

In accordance with the present invention, there is provided a foamable thermoplastic resin composition comprising a blend of (A) a vinyl chloride polymer comprised of at least 80 percent by weight of vinyl chloride and no more than 20 percent by weight of at least one other copolymerizable monoethylinically unsaturated monomer; and (B) an alphamethyl styrene-unsaturated nitrile copolymer which is preferably graft copolymer comprising (i) a superstrate comprising grafting monomers of alphamethyl styrene, unsaturated nitrile and unsubstituted styrene, and (ii) a substrate comprising butadiene rubber;

(C) a rubber-free alkyl methacrylate-vinyl aromatic-unsaturated nitrile copolymer; and (D) a chemical blowing agent. The foamable thermoplastic resin composition may be coextruded to form a rigid foam article having (a) a first non-foamed thermoplastic resin skin adhered to (b) a rigid foam layer, and optionally (c) a second non-foamed thermoplastic resin skin adhered to the foam layer which effectively sandwiches the foam layer between the first skin and the second skin. The present invention further involves extruding the foamable thermoplastic resin composition, and allowing the composition to foam to form a formed article, and optionally to form a foamed in place skin for the article. The present invention further involves the process for making a coextruded rigid foam structure, involving (a) a coextruding a polymeric composition which is free of chemical blowing agents to form the first non-foamed thermoplastic resin skin and the foamable thermoplastic resin composition, and allowing the composition to foam in the presence of the skin.

DETAILED DESCRIPTION OF THE INVENTION

Figure 1:
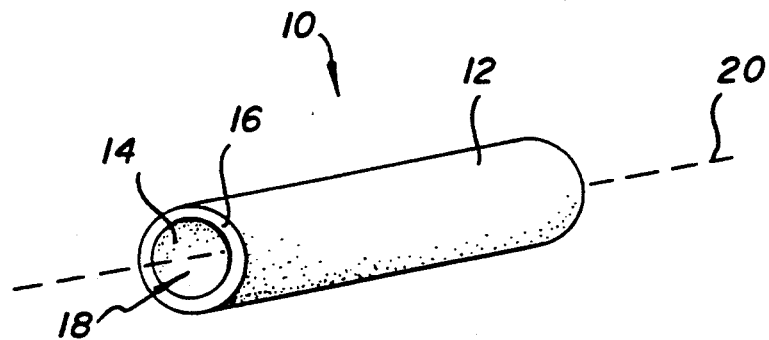
FIG. 1 is a perspective view of an article of the present invention in pipe form.

The vinyl chloride polymers are polyvinyl chloride comprised of no less than 80% by weight of vinyl chloride and no more than 20% by weight of at least one other copolymerizable monoethylenically unsaturated monomer. Such copolymerizable monoethylenically unsaturated monomers include, for example, monoolefins such as ethylene and propylene, vinyl alkanoates such as vinyl acetate; vinylidene halides such as vinylidene chloride; alkyl esters of an acrylic or methacrylic acid such as ethyl acrylate, 2-ethylhexyl acrylate and ethyl methacrylate; unsaturated nitriles such as acrylonitrile; alkyl vinyl ethers; and aromatic vinyl compounds such as styrene. Although the molecular weight of the vinyl chloride polymers is not critical to the aims of the invention, the vinyl chloride polymers should preferably possess a polymerization degree of 600 to 1,500 for general applications. The vinyl chloride polymers may be prepared by a suspension, an emulsion or a bulk polymerization procedure.

The graft copolymer is prepared by polymerizing alphamethyl styrene, unsaturated nitrile, and optionally unsubstituted styrene in the presence of a butadiene rubber. The polymerization results in the graft copolymer having a butadiene rubber substrate and a alphamethyl styrene-unsaturated nitrile and optionally unsubstituted styrene superstrate grafted onto the substrate. Preferably the superstrate is in the form of a single stage, but may be optionally formed as a multiple stage superstrate.

By the term "butadiene rubber" used herein is meant a copolymer comprising at least approximately 50% by weight of butadiene and not more than approximately 50% by weight of at least one copolymerizable ethylenically unsaturated monomer. Such butadiene rubbers include, for example, copolymers such as butadiene/styrene, butadiene/α-methylstyrene and butadiene/vinyltoluene, and terpolymers such as butadiene/an aromatic vinyl compound/an acrylic acid alkyl esters, butadiene/an aromatic vinyl compound/a methyacrylic acid alkyl ester and butadiene/an aromatic vinyl compound/an unsaturated nitrile. The aromatic vinyl compound, the acrylic acid alkyl ester, the methacrylic acid alkyl ester and the unsaturated nitrile, which are to be copolymerized with butadiene, include, for example, styrene, α-methylstyrene, vinyltoluene and t-butylstyrene; acrylic acid alkyl esters, the alkyl group having 2 to 18 carbon atoms; methacrylic acid alkyl esters, the alkyl group having 2 to 18 carbon atoms, and; acrylonitrile and methacrylontrile, respectively.

Exemplary of ethylenically unsaturated nitriles which may be used in the graft superstrate of the graft copolymer are acrylonitrile, methylacrylonitrile, ethacrylonitrile, and mixtures thereof.

The rubber-free alkyl methacrylate-vinyl aromatic-unsaturated nitrile copolymer contained units formed by alkyl methacrylate monomer, vinyl aromatic monomer, and unsaturated nitrile monomer, and may be referred to as comprising alkyl methacrylate monomer, vinyl aromatic monomer, and unsaturated nitrile monomer. Exemplary of alkyl methacrylate monomers include methyl methacrylate and ethyl methacrylate. Exemplary of monovinyl aromatic monomers which may be used in the rubber-free copolymer are styrene, α-methyl styrene, vinyl naphthalene, alkyl-substituted styrene such as 3,4-dimethylstyrene and vinyltoluene, or halosubstituted styrene such as p-bromostyrene and p-chlorostyrene can also be used. Exemplary of unsaturated nitrile monomers which may be used in the rubber-free alkyl methacrylate-vinyl aromatic-unsaturated nitrile copolymer are the same unsaturated nitrile monomers as are set out above for the graft copolymer.

Chemical blowing agent which can be any of a variety of chemical blowing agents which release a gas upon thermo decomposition. Chemical blowing agents may also be referred to as foaming agents. The blowing agent (or agents, if more than one is used, which is permissible), of the present compositions, can be selected from chemicals containing decomposable groups such as azo, N-nitroso, carboxylate, carbonate, heterocyclic nitrogen-containing and sulfonyl hydrazide groups. Generally, they are solid materials that liberate gas(es) when heated by means of a chemical reaction or upon decomposition. Representative compounds include azodicarbonamide, bicarbonates, dinitrosopentamethylene tetramethylene tetramine, p,p'-oxy-bis(benzenesulfonyl)-hydrazide, benzene-1,3-disulfonyl hydrazide, aso-bis-(isobutyronitrile), biuret and urea. The dihydrooxadiazinones of U.S. Pat. No. 4,097,425 are members of an especially preferred family of blowing agents. The blowing agent may be added to the polymer in several different ways which are known to those skilled in the art, for example, by adding the solid powder, liquid or gaseous agents directly to the resin in the extruder while the resin is in the molten state to obtain uniform dispersal of the agent in the molten plastic. Preferably the blowing agent is added before the extrusion process and is in the form of a solid. The temperature and pressures to which the foamable composition of the invention are subjected to provide a foamed composition will vary within a wide range, depending upon the amount and type of foaming agent that is used. The preferred foaming agents are dinitrosopentamethylene tetramine, p-toluene sulfonyl semicarbazide, 5-phenyltetrazole, calcium oxalate, trihydrazino-s-triazine, 5-phenyl-3,6-dihydro-1,3,4-oxadiazin-2-one, 3,6-dihydro-5,6-diphenyl-1,3,4-oxadiazin-2-one, azodicarboamide and mixtures of any of them.

The foamable thermoplastic resin compositions preferably contain the vinyl chloride polymer at a level of from 50 to 99 weight percent, more preferably 65 to 98 weight percent, and most preferably 90 to 97 weight percent based on the entire weight of the foamable composition. The alphamethyl styrene-unsaturated nitrile copolymer is preferably a graft copolymer and is preferably present at a level of from 0.5 to 10 percent by weight, more preferably present at a level of from 1 to 5 percent by weight, and most preferably present at a level of 2 to 4 percent by weight based on the entire weight of the foamable composition. Preferably the rubber-free alkyl methacrylate-vinyl aromatic-unsaturated nitrile copolymer is present at a level of 0.5 to 10 percent by weight, more preferably present at a level of from 1 to 5 percent by weight, and most preferably present at a level of 2 to 4 percent by weight based on the entire weight of the foamable composition. Preferably the blowing agent is present in the foamable composition at a level of from 0.1 to 1 percent by weight, more preferably at a level of from 0.2 to 0.5 percent by weight, and most preferably at a level of 0.3 to 0.4 percent by weight based on the entire weight of the foamable composition. The resultant foamed layer will comprise corresponding amounts of the vinyl chloride polymer, alphamethyl styrene-unsaturated nitrile copolymer, and the rubber-free alkyl methacrylate-vinyl aromatic-unsaturated nitrile copolymer, absent the decomposed very minor amount of blowing agent.

The graft copolymer preferably has the following chemical makeup. Preferably the superstrate rigid polymer is present at a level of from 50 to 95 percent by weight based on the entire weight of the graft copolymer, more preferably present at a level of from 70 to 93 percent by weight thereof, and most preferably present at a level of from 85 to 90 percent by weight thereof. The superstrate preferably contains alphamethyl styrene monomer present at a level of from 30 to 80 percent by weight based on the entire weight of the graft copolymer, more preferably from 40 to 60 percent by weight thereof, and most preferably from 50 to 55 percent by weight thereof. The superstrate preferably contains unsaturated nitrile monomer present at a level of from 15 to 35 percent by weight based on the entire weight of the graft copolymer, more preferably from 20 to 30 percent by weight thereof, and most preferably from 23 to 28 percent by weight thereof. Preferably the superstrate contains unsubstituted styrene present at a level of from 0 to 30 percent by weight based on the entire weight of the graft copolymer, more preferably from 5 to 15 percent by weight thereof, and most preferably from 8 to 12 percent by weight thereof. Preferably the butadiene rubber substrate is present at a level of from 5 to 50 percent by weight based on the total weight of the graft copolymer, more preferably present at a level of from 7 to 30 percent by weight thereof, and most preferably present at a level of from 10 to 15 percent by weight thereof. As an alternative to the graft copolymer, rubber free alphamethyl styrene-unsaturated copolymer may be used comprising 30 to 85 percent alphamethyl styrene and 15 to 50 percent unsaturated nitrile (such as acrylonitrile) and optionally 1 to 40 percent comonomers such as unsubstituted styrene. The graft copolymer and the rubber free alphamethyl styrene-acrylonitrile copolymer may be referred to as a group as alpha-methyl styrene-acrylonitrile polymers.

The rubber-free alkyl methacrylate-vinyl aromatic-unsaturated nitrile copolymer preferably comprises from 20 to 60 percent by weight alkyl methacrylate based on the total weight of the rubber-free copolymer, more preferably from 35 to 55 percent by weight thereof, most preferably from 46 to 52 percent by weight thereof; preferably the vinyl aromatic monomer is present in the rubber-free copolymer at a level of from 10 to 50 percent by weight based on the total weight of the rubber-free copolymer, most preferably present at a level of from 25 to 45 percent by weight thereof, and most preferably present at a level of from 38 to 42 percent by weight thereof; and the unsaturated nitrile is preferably present in the rubber-free copolymer at a level of from 5 to 35 percent by weight based on the total weight of the rubber-free copolymer, more preferably present at a level of from 7 to 25 percent by weight thereof, and most preferably present at a level of from 9 to 13 percent by weight thereof.

The coextruded rigid foam article (structure) has a first non-foamed thermoplastic resin skin, preferably having a density of between 1.2 and 1.8 grams per centimeter cubed, and a rigid foam layer made from the foam of the foamable thermoplastic resin composition, the foam layer preferably having a density of between 0.5 and 1.0. The thermoplastic resin skin layers preferably each have a thickness of between 0.005 inch and 0.150 inch, and are preferably made from a polymeric composition containing materials selected from the group consisting of vinyl chloride polymers, rubber modified graft copolymers (such as acrylonitrile-butadiene-styrene graft copolymers), polyolefins such as polyethylene and polypropylene, and vinyl aromatic polymers such as polystyrene and impact modified polystyrene. Preferably the non-foamed thermoplastic resin skins are made from vinyl chloride polymer.

Figure 2:
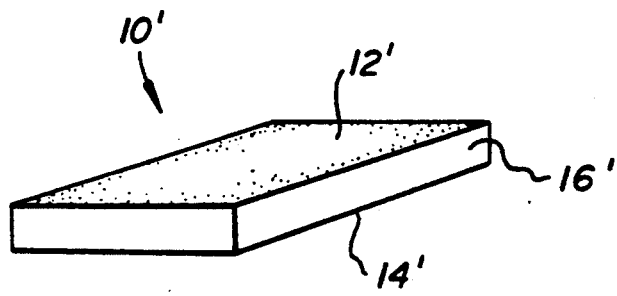
FIG. 2 is a perspective view of an article of the present invention in sheet form.

The coextruded rigid foam article (10, 10') as illustrated in FIGS. 1 and 2 preferably has a first thermoplastic resin skin layer (12, 12') adhered to the polymeric foam layer (16, 16') and adjacent thereto, and providing the outer surface protective layer for the polymeric foam layer (16, 16'). A second non-foamed thermoplastic skin (14, 14') made from the above materials, may be employed in the coextrude rigid foam article such that the foam layer is located between the first and second non-foamed layers, to provide a structure having a first skin (12, 12') and a second skin (14, 14') with a foam layer (16, 16') sandwiched therebetween, wherein the first skin (12, 12') and the second skin (14, 14') are both attached to the foam layer (16, 16'), on opposite sides of the foam layer (16, 16'). Suitable articles include those of a flat planar sheet like structure (10') of FIG. 2 which, for example, may be rectangular in shape and which has the first thermoplastic resin skin (12') as an outer layer, the second thermoplastic resin skin (14') as the inner layer and the foam layer (16') sandwiched between the first resin skin layer (12') and the second resin skin layer (14'). Alternatively, the structure may be in the form of a tabular pipe (10) as shown in FIG. 1 having an internal, central flow passage (18) running along the longitudinal axis (20) of the pipe in the interior of the pipe, and having the second resin skin layer (14) adjacent to the interior of the pipe to protect the foam (16) from fluids flowing therein, and having the first skin (12) attached to the outer surface of the foam layer (16), the foam layer (16) being in a cylindrical, annular shape, and being in the circular shape in cross section perpendicular to the longitudinal axis of the pipe (10), the second skin being in circular cross section perpendicular to the longitudinal axis of the pipe (10), and the first skin being circular in cross section perpendicular to the longitudinal axis of the pipe (10). Alternatively, the sheet structure and pipe structures may have only the first skin or the second skin attached to the foam layer, thereby having only one skin and lacking the other.

Coextrusion processes for making foam are generally well known. Use of the present composition in coextrusion process for making a coextruded rigid foam structure having a protective non-foam skin and a protected foam layer, is provided and generates improved results such as better cell structure, potentially better economics and reduced degradation of the vinyl chloride polymer in the foam, by using the present foamable thermoplastic resin composition. The process involves (a) coextruding the polymeric composition for the non-foam thermoplastic skin and the foamable thermoplastic resin composition for the foam layer, (b) allowing the foamable thermoplastic resin composition to foam while in the presence of the skin by heating the compositions sufficiently to cause the blowing agent to release sufficient quantities of gas to foam the composition thereby placing the foam in adherence with skin, and (c) allowing the foam to cool sufficiently to solidify. As an alternative to coextrusion of a skin and the foamable material, the foamable material may be extruded and allowed to foam in a fashion to produce a skin layer from the foamable composition itself.

The compositions may also contain nucleating agents.

The following examples illustrate the present invention, but are not meant to limit the scope thereof.

EXAMPLES

Foam density reduction and impact strength performance of a composition of the present invention over a prior polyvinyl chloride foam composition is set out in Table 1.

Example 1 is a foamed composition illustrating the present invention. The formulation of example 1 contained 100 parts by weight (pbw) polyvinyl chloride, 0.35 azo dicarboamide blowing agent, 5 pbw ultrafine $CaCO_3$, 1 pbw $TiO_2$ pigment, 2 pbw alpha methylstyrene-acrylonitrile-styrene-butadiene graft copolymer, and 2 pbw methyl methacrylate-styrene-acrylonitrile copolymer.

Comparative Example 2 (CEX2) is a foamed composition of a comparative formulation containing 100 pbw polyvinyl chloride, 0.35 pbw azo dicarboamide blowing agent, 5 pbw ultrafine $CaCO_3$, 1 pbw $TiO_2$ pigment, 2 pbw methyl methacrylate-styrene-butylacrylate graft copolymer, 2 pbw polymethyl methacrylate, 1 part polymethyl methacrylate-polystyrene.

TABLE 1

| PROPERTIES OF FOAMED COMPOSITIONS | | |
|---|---|---|
| Examples | Ex 1 | Cex 2 |
| Density reduction (%) | 35 | 28 |
| Impact strength (ft/lb) | 100 | 80 |

Note the improved impact strength and density reduction obtained by the composition of the present invention.

What is claimed is:

1. A process for making coextruded rigid foam article having a thermoplastic foam layer and a protective non-foamed thermoplastic skin layer, said process comprising;
   a) coextruding (i) a non-foamed thermoplastic skin and (ii) a foamable thermoplastic resin composition, said composition comprising (A) vinyl chloride polymer, (B) a graft copolymer comprising a superstrate comprising alphamethyl styrene, acrylonitrile and styrene, and a substrate having grafted thereon the superstrate, said substrate comprising a butadiene rubber, (C) a rubber-free copolymer comprising methyl methacrylate, styrene and acrylonitrile, and (D) a blowing agent.

2. The process of claim 1 wherein said foam is coextruded between two skins to produce a article having a foam layer sandwiched between two non-foamed skins.

3. The process of claim 1 wherein said coextrusion process produces a foamed pipe article.

4. The process of claim 1 wherein said process produces a foamed sheet article.

5. The process of claim 1 wherein said composition consists essentially of said vinyl chloride polymer, said graft copolymer, said rubber-free copolymer, and said blowing agent.

6. The process of claim 1 wherein said composition comprises from 1 to 5 percent by weight of the graft copolymer based on the entire weight of the composition, from 1 to 5 percent by weight of the rubber-free copolymer based on the entire weight of the composition, from 0.2 to 0.5 percent by weight of the blowing agent based on the entire weight of the composition, and from 65 to 98 percent by weight vinyl chloride polymer based on the entire weight of the composition.

* * * * *